(12) United States Patent
Kim et al.

(10) Patent No.: US 10,809,449 B2
(45) Date of Patent: Oct. 20, 2020

(54) WAVEGUIDE TUBE INCLUDING LIGHT-SHIELDING FILM AND METHOD FOR MANUFACTURING SAME

(71) Applicant: LG Chem, Ltd., Seoul (KR)

(72) Inventors: Areum Kim, Daejeon (KR); Jaehyun Yoo, Daejeon (KR); Sungeun Park, Daejeon (KR); Joonhyung Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/488,094

(22) PCT Filed: Nov. 19, 2018

(86) PCT No.: PCT/KR2018/014172
§ 371 (c)(1),
(2) Date: Aug. 22, 2019

(87) PCT Pub. No.: WO2019/103415
PCT Pub. Date: May 31, 2019

(65) Prior Publication Data
US 2020/0064539 A1    Feb. 27, 2020

(30) Foreign Application Priority Data

Nov. 24, 2017 (KR) .......................... 10-2017-0158454

(51) Int. Cl.
*G02B 27/01* (2006.01)
*F21V 8/00* (2006.01)
(Continued)

(52) U.S. Cl.
CPC .......... *G02B 6/0065* (2013.01); *G02B 6/0011* (2013.01); *G02B 27/0101* (2013.01);
(Continued)

(58) Field of Classification Search
CPC ................ G02B 6/0011; G02B 6/0065; G02B 27/0018; G02B 27/0101; G02B 27/0172; G02B 5/003; C09C 1/48
See application file for complete search history.

(56) References Cited

U.S. PATENT DOCUMENTS 8,531,773 B2 *    9/2013    DeJong .............. G02B 27/0101
                                                                    359/630
2008/0037927 A1    2/2008    Kurihara et al.
(Continued)

FOREIGN PATENT DOCUMENTS

CN    104791660 A    7/2015
CN    105629468 A    6/2016
(Continued)

OTHER PUBLICATIONS

Supplementary Extended European Search Report from International PCT/KR2018/014172 dated Mar. 6, 2020. (Year: 2020).*
(Continued)

*Primary Examiner* — Daniel Petkovsek
(74) *Attorney, Agent, or Firm* — Lerner, David, Littenberg, Krumholz & Mentlik, LLP (57) ABSTRACT

A waveguide and a method for manufacturing the same are disclosed herein. In an embodiment, the waveguide includes a waveguide tube and a light-shielding film disposed on a cutsurface of the rim side of the waveguide tube. The light-shielding film has a thickness of 2 to 120 μm, an optical density (OD) of 0.01 to 0.7 on the basis of a light-shielding film thickness of 1.0 μm, and a hardness of 3H or more in accordance with ASTM D3363 standard.

13 Claims, 2 Drawing Sheets (51) Int. Cl.
  *C09C 1/48* (2006.01)
  *G06T 19/00* (2011.01)
  *G02B 27/00* (2006.01)
(52) U.S. Cl.
  CPC ............ *G02B 27/0172* (2013.01); *C09C 1/48* (2013.01); *G02B 27/0018* (2013.01); *G06T 19/006* (2013.01)

(56) References Cited

U.S. PATENT DOCUMENTS

| | | |
|---|---|---|
| 2008/0277588 A1 | 11/2008 | Zeitler et al. |
| 2009/0056791 A1* | 3/2009 | Pfenninger ............ H01L 31/055 136/247 |
| 2009/0102763 A1 | 4/2009 | Border et al. |
| 2012/0162549 A1 | 6/2012 | Gao et al. |
| 2012/0176682 A1 | 7/2012 | DeJong |
| 2012/0250353 A1 | 10/2012 | Sakamoto et al. |
| 2015/0266313 A1 | 9/2015 | Kubota et al. |
| 2016/0131898 A1 | 5/2016 | Chen et al. |
| 2017/0045676 A1 | 2/2017 | Zhou |
| 2017/0293149 A1 | 10/2017 | Tatsugi |
| 2019/0039394 A1 | 2/2019 | Yoo et al. |
| 2019/0285794 A1* | 9/2019 | Kim .................. G02B 6/10 |

FOREIGN PATENT DOCUMENTS

| | | |
|---|---|---|
| JP | 2008533484 A | 8/2008 |
| JP | 2011119135 A | 6/2011 |
| JP | 2015096883 A | 5/2015 |
| KR | 20090027076 A | 3/2009 |
| KR | 20100088680 A | 8/2010 |
| KR | 20120076973 A | 7/2012 |
| KR | 20140011637 A | 1/2014 |
| KR | 20160091402 A | 8/2016 |
| KR | 20170115797 A | 10/2017 |
| TW | 201634975 A | 10/2016 |
| WO | 2017175971 A1 | 10/2017 |

OTHER PUBLICATIONS

Search report from International Application No. PCT/KR2018/014172, dated Feb. 25, 2019.
Search List from Chinese Office Action for CN201880010876.0 dated Mar. 25, 2020; 5 pages.
Extended European Search Report including Written Opinion for EP18881823.1 dated Mar. 6, 2020; 7 pages.
Search Report from 1st Office Action for Taiwanese Application 107141266 dated Jan. 21, 2020; 1 page.

* cited by examiner

WAVEGUIDE TUBE INCLUDING LIGHT-SHIELDING FILM AND METHOD FOR MANUFACTURING SAME

CROSS-REFERENCE TO RELATED APPLICATIONS

The present application is a national phase entry under 35 U.S.C. § 371 of International Application No. PCT/KR2018/014172, filed on Nov. 19, 2018, which claims the benefit of priority from Korean Patent Application No. 10-2017-0158454, filed on Nov. 24, 2017, the disclosures of which are incorporated herein by reference.

FIELD OF THE INVENTION

The present invention relates to a waveguide having a light-shielding film, and more particularly, to a waveguide comprising a light-shielding layer for suppressing light leakage and external light inflow.

BACKGROUND OF THE INVENTION

Figure 1:
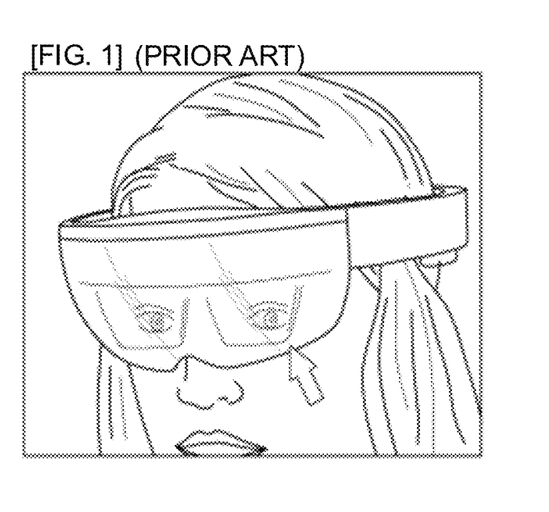
FIG. 1 is a schematic drawing showing the use of a waveguide and light leakage phenomenon in accordance with the prior art.

A wearable augmented reality device represented by augmented reality (AR) glasses requires a near-eye display (NED) to transmit a digital image to the user's eyes. One of the components of the NED is a planar waveguide. The light incident on the waveguide is transmitted in a direction parallel to the waveguide plane and is reflected by a grating or a half mirror to reach the user's eyes. At this time, some light propagate to the end of the waveguide and emit from the edge of the waveguide, causing the light leakage phenomenon as shown in FIG. 1 during operating the NED. Such a phenomenon should be improved because it impairs user's convenience and aesthetics when the product is operated. Also, external light entering the waveguide at the edge of the waveguide may cause unintended optical interference, which may result in degradation of image quality.

Therefore, by forming a light-shielding coating on the cut portion of the edge of the waveguide, it is possible to suppress the inflow of external light to prevent the quality degradation of output image from the NED. In the past, for a light-shielding a plastic case was put on a waveguide or a tape was attached to a rim of a waveguide.

However, in the above methods, the thickness of the light-shielding layer is as thick as, for example, several hundreds of microns to several tens of millimeters, and it was difficult to control the width of the light-shielding coating thinly and precisely to the level of several hundreds of nanometers to several hundreds of microns.

PRIOR ART DOCUMENT

Patent Literature (Patent Document 1) KR 10-2012-0076973 A

SUMMARY OF THE INVENTION

It is difficult to coat a narrow cut surface of a waveguide with an ink for forming a light-shielding film by a conventional means such as contact printing, for example screen printing. In particular, when the cut surface of the waveguide is a curved surface or an inclined surface, it was difficult to precisely coat the cut surface with the light-shielding layer. However, a valve dispenser method as a non-contact printing method enables a precise printing even in a narrow cut portion having a curved surface or an inclined surface.

It is an object of the present invention to provide a waveguide for preventing light leakage occurring at the rim side of the waveguide and inflow of external light into the waveguide, by coating black ink on a cut surface of the waveguide to form a light-shielding film.

In order to solve the above problems, the present invention provides a planar waveguide including a waveguide tube and a light-shielding film with a thickness of 2 to 120 μm disposed on a cut surface of a rim side of the waveguide tube, wherein the light-shielding film has an optical density (OD) of 0.01 to 0.7 on the basis of the light-shielding film of a thickness of 1.0 μm.

Further, the present invention provides a method for manufacturing a waveguide, comprising the steps of: a) coating a curable ink composition on a cut surface of a rim side of the waveguide tube; and b) curing the curable ink composition to obtain a light-shielding film with a thickness of 2 to 120 μm, and having an optical density (OD) of 0.01 to 0.7 on the basis of its thickness of 1.0 μm.

In one aspect, the curable ink composition comprises a colorant, an epoxy compound, an oxetane compound, and a photopolymerization initiator.

In another aspect, the curable ink composition comprises a colorant, an acrylate monomer, a urethane acrylate oligomer, an organosilane, and a photopolymerization initiator.

The present invention also provides a waveguide module comprising the waveguide as above.

Effect of the Invention

According to the present invention, the light leakage phenomenon occurring at the edge of the waveguide and the inflow of external light into the waveguide can be prevented by coating the composition according to the present invention on a cut surface of a rim side of the waveguide to form a light-shielding film having excellent optical density and excellent hardness even in a thin thickness.

DETAILED DESCRIPTION OF THE INVENTION

Hereinafter, the present invention will be described in more detail.

The present invention provides a planar waveguide including a light-shielding film on a cut surface of a rim side of the waveguide.

When light is entered and reflected by the inner wall of the planar waveguide, if the appropriate shielding film is not formed on the cut surface of the waveguide, there arises a problem that internal light emits (light leakage phenomenon) or unnecessary light is introduced from the outside.

Figure 2:
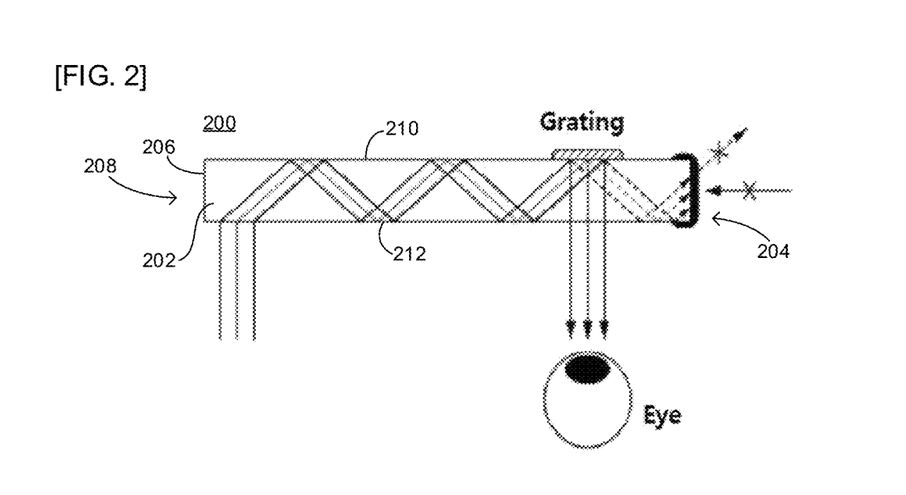
FIG. 2 is a schematic view showing a light traveling path according to the waveguide of the present invention.

As shown in FIG. 2, the planar waveguide (200) of the present invention includes a waveguide tube (202) and a light-shielding film (204) disposed on a cut surface (206) of a rim side (208) of the waveguide tube (202). The light-shielding film (204) having a thin thickness and excellent optical density (OD) on the cut surface (206) of the rim side (208). Due to this, it is possible to block the emission of internal light and the inflow of external light.

The waveguide tube (202) includes a first surface (210) and an opposing second surface (212) separated by a thickness therebetween. The first and second surfaces (210, 212) extend to the rim side (208).

The cut surface (206) of the rim side (208) of the waveguide tube (202) having the light-shielding film (204) may be a planar surface, a curved surface, or an inclined surface. The light-shielding film (204) of the present invention can be formed in various shapes by a manufacturing method described later.

Further, the light-shielding film (204) may be formed on first and second surfaces (210, 212) at the periphery thereof (as illustrated in FIG. 2) and on the cut surface (206) of the rim side (208) of the waveguide tube (202). By forming the light-shielding film (204) not only on the periphery of the first and second surfaces (210, 212) but also on the rim side (including the edge), it is possible to block the emission of internal light and the inflow of external light in the waveguide.

The light-shielding film comprises at least one black ink pigment selected from the group consisting of carbon black, graphite, metal oxide, organic black pigments.

Examples of carbon black include Cisto 5HIISAF-HS, Cisto KH, Cisto 3HHAF-HS, Cisto NH, Cisto 3M, Cisto 300HAF-LS, Cisto 116HMMAF-HS, Cisto 116MAF, Cisto FMFEF-HS, Cisto SOFEF, Cisto VGPF, Cisto SVHSRF-HS, and Cisto SSRF (Donghae Carbon Co., Ltd.); Diagram black II, Diagram black N339, Diagram black SH, Diagram black H, Diagram LH, Diagram HA, Diagram SF, Diagram N550M, Diagram M, Diagram E, Diagram G, Diagram R, Diagram N760M, Diagram LR, #2700, #2600, #2400, #2350, #2300, #2200, #1000, #980, #900, MCF88, #52, #50, #47, #45, #45L, #25, # CF9, #95, #3030, #3050, MA7, MA77, MA8, MA11, MA100, MA40, OIL7B, OIL9B, OIL11B, OIL30B and OIL31B (Mitsubishi Chemical Corporation); PRINTEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX-35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100 and LAMP BLACK-101 (Degussa Co., Ltd.); RAVEN-1100ULTRA, RAVEN-108OUL-TRA, RAVEN-106OULTRA, RAVEN-1040, RAVEN-1035, RAVEN-1020, RAVEN-1000, RAVEN-890H, RAVEN-890, RAVEN-88OULTRA, RAVEN-86OULTRA, RAVEN-850, RAVEN-820, RAVEN-79OULTRA, RAVEN-78OULTRA, RAVEN-76OULTRA, RAVEN-520, RAVEN-500, RAVEN-460, RAVEN-450, RAVEN-43OULTRA, RAVEN-420, RAVEN-410, RAVEN-250OULTRA, RAVEN-2000, RAVEN-1500, RAVEN-1255, RAVEN-1250, RAVEN-1200, RAVEN-119OULTRA, and RAVEN-1170 (Columbia Carbon Co.), mixtures thereof, or the like.

As the organic black pigments, aniline black, lactam black, or perylene black series may be used, but the organic black pigments are not limited thereto.

The content of the black ink pigments may be 0.1 to 15% by weight based on the total weight of the light-shielding film. If the content of the pigments satisfies the above range, it is possible to manufacture a light-shielding film having a high optical density per its thickness while securing dispersion stability and storage stability of ink without impairing the ultraviolet (UV) curing of the film.

Figure 3:
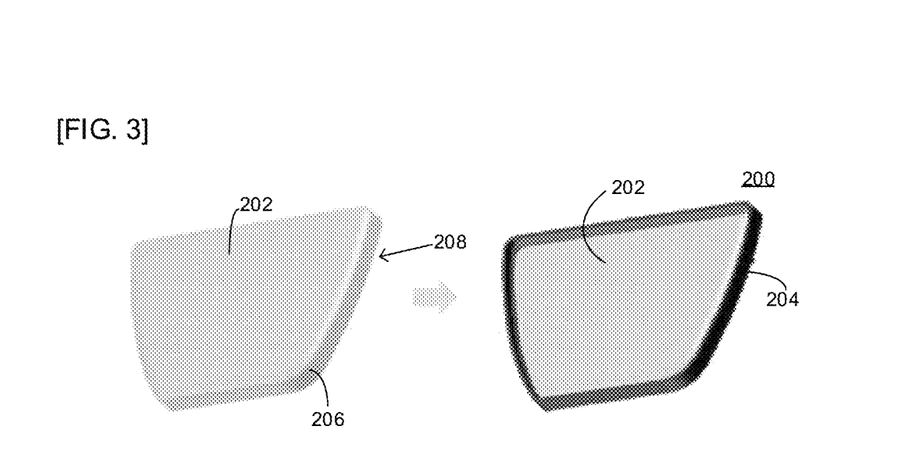
FIG. 3 is a schematic view illustrating a process of forming a light-shielding film of the waveguide of the present invention.

As shown in FIG. 3, the waveguide (200) of the present invention having the light-shielding film (204) on the cut surface (206) of the rim side (208) can suppress the light leakage and block the inflow of external light.

For this, as described above, the thickness of the light-shielding film may be 2 to 120 μm, and in another embodiment may be 3 to 60 μm. It has been difficult to form a light-shielding film having such a thin thickness by the prior art such as a light-shielding tape attaching method or a case attaching method. However, the waveguide of the present invention can suppress the light leakage and block the inflow of the external light, even though the waveguide has a thin thickness of the light-shielding film.

In addition, the waveguide of the present invention may have a total optical density (OD) of 1.5 or more in order to suppress the light leakage and block the inflow of external light. When the above range is satisfied, the shielding property of the light-shielding film is sufficient. The optical density (OD) of the film is preferably 0.01 to 0.7 on the basis of its thickness of 1.0 μm.

In particular, if the thickness of the film is 2 to 80 μm, its optical density (OD) may be 0.03 to 0.7 on the basis of its thickness of 1.0 μm. If the thickness of the film is 80 to 120 μm, its optical density (OD) may be 0.01 to 0.03 on the basis of its thickness of 1.0 μm. When the above range is satisfied, the light-shielding property of the film of the present invention is optimized.

Further, the hardness of the film with respect to the waveguide is excellent. For example, the hardness may be pencil hardness from HB to 9H according to the ASTM D3363 standard.

The present invention provides a method for manufacturing a planar waveguide, comprising the steps of: a) coating a curable ink composition on a cut surface of a rim side of the waveguide tube; and b) curing the light-shielding film to form a light-shielding film.

In one aspect, the curable ink composition may comprise a colorant, an epoxy compound, an oxetane compound, and a photopolymerization initiator. In addition, the curable ink composition may further comprise at least one selected from the group consisting of a surfactant, an adhesion promoter, a diluent, and a photosensitizer.

In another aspect, the curable ink composition may comprise a colorant, an acrylate monomer, a urethane acrylate oligomer, an organosilane, and a photopolymerization initiator. In addition, the curable ink composition of the present invention may further comprise at least one selected from the group consisting of a surfactant, an adhesion promoter, a diluent, and a photosensitizer.

The curable ink composition may not contain a solvent.

The advantages of the curable ink composition can be maximized by the combination of the respective components. Hereinafter, each component of the curable ink composition will be described in detail.

The curable ink composition used in the present invention contains an epoxy compound as a cationic curable component. Specifically, the epoxy compound may be one or a mixture of the two selected from a bisphenol-based epoxy compound, a novolak-based epoxy compound, a glycidylester-based epoxy compound, a glycidylamine-based epoxy compound, a linear aliphatic epoxy compound, a biphenyl-based epoxy compound and an alicyclic epoxy compound.

The alicyclic epoxy compound may refer to a compound containing at least one epoxidized aliphatic cyclic group.

The epoxidized aliphatic cyclic group refers to an epoxy group bonded to an alicyclic ring. Examples thereof include a functional group such as a 3,4-epoxycyclopentyl group, a 3,4-epoxycyclohexyl group, a 3,4-epoxycyclopentylmethyl group, a 3,4-epoxycyclohexylmethyl group, a 2-(3,4-epoxycyclopentyl)ethyl group, a 2-(3,4-epoxycyclohexyl)ethyl group, a 3-(3,4-epoxycyclopentyl)propyl group or a 3-(3,4-epoxycyclohexyl)propyl group. The hydrogen atom constituting the alicyclic ring may be optionally substituted with a substituent such as an alkyl group. The alicyclic epoxy compound includes the compounds specifically exemplified below, but is not limited to thereto.

There may be used, for example, dicyclopentadiene dioxide, cyclohexene oxide, 4-vinyl-1,2-epoxy-4-vinylcyclohexene, vinylcyclohexene dioxide, limonene monoxide, limonene dioxide, (3,4-epoxycyclohexyl)methyl-3,4-epoxycyclohexane carboxylate, 3-vinylcyclohexene oxide, bis(2,3-epoxycyclopentyl)ether, bis(3,4-epoxycyclohexylmethyl)adipate, bis(3,4-epoxy-6-methylcyclohexylmethyl) adipate, (3,4-epoxycyclohexyl)methyl alcohol, (3,4-epoxy-6-methylcyclohexyl)methyl-3,4-epoxy-6-methylcyclohexane carboxylate, ethylene glycol bis(3,4-epoxycyclohexyl)ether, 3,4-epoxycyclohexene carboxylic ethylene glycol diester, (3,4-epoxycyclohexyl)ethyltrimethoxysilane and Celloxide 8000 (manufactured by Daicel Corporation).

The content of the epoxy compound is preferably 40 to 80% by weight, alternatively 50 to 70% by weight based on the total weight of the curable ink composition. If it exceeds 80% by weight, viscosity of the ink composition is increased. If it is less than 40% by weight, curing sensitivity of the ink composition is reduced.

The curable ink composition may contain an oxetane compound as a cationic polymerizable monomer. The oxetane compound, which has a quaternary cyclic ether group in the molecular structure, may serve to lower the viscosity of the cationically cured ink composition (for example, less than 50 cPs at 25° C.).

Specifically, there may be exemplified by 3-ethyl-3-hydroxymethyl oxetane, 1,4-bis[(3-ethyl-3-oxetanyl)methoxymethyl]benzene, 3-ethyl-3-(phenoxymethyl)oxetane, di[(3-ethyl-3-oxetanyl)methyl]ether, 3-ethyl-3-(2-ethylhexyloxymethyl)oxetane, 3-ethyl-3-cyclohexyloxymethyl oxetane or phenol novolak oxetane. Examples of the oxetane compound include Aron oxetane OXT-101, Aron oxetane OXT-121, Aron oxetane OXT-211, Alon oxetane OXT-221, Aron oxetane OXT-212 and the like. These may be used alone or in combination of two or more.

The content of the oxetane compound is preferably 10 to 40% by weight, alternatively 10 to 20% by weight based on the total weight of the curable ink composition. If it is more than 40% by weight, curing sensitivity of the ink composition is low. If it is less than 10% by weight, the viscosity of the ink composition increases, thereby reducing its coating properties.

The oxetane compound may be oxetane compounds having one oxetane ring or having two oxetane rings. When the oxetane compound having one oxetane ring and the oxetane compound having two oxetane rings are used together, there are advantages in that viscosity of the ink composition and flexibility of the coated film can be controlled. When the oxetane compounds are used together as described above, it is preferred that the content ratio of the oxetane compound having one oxetane ring: the oxetane compound having two oxetane rings is in the range of 1:3 to 1:16.

The curable ink composition of the present invention comprises a compound which produces a cationic species or a Bronsted acid by irradiation of UV light as a cationic photopolymerization initiator, for example, an iodonium salt or a sulfonium salt, but not limited thereto.

The iodonium salt or the sulfonium salt causes a curing reaction of monomers having unsaturated double bond(s) contained in the ink composition to produce a polymer during a UV curing process. A photosensitizer may also be used depending on the polymerization efficiency of the monomers.

The photopolymerization initiator may be those having anions such as $SbF_6^-$, $AsF_6^-$, $BF_6^-$, $(C_6F_6)_4B^-$, $PF_6^-$ or $Rf_nF_{6-n}$, but is not limited thereto.

The photopolymerization initiator is preferably contained in an amount of 0.5 to 10% by weight based on the total weight of the curable ink composition. If the content of the photopolymerization initiator is less than 0.5% by weight, the curing reaction may not be sufficiently performed. If the content of the photopolymerization initiator is more than 10% by weight, the photopolymerization initiator may not be completely dissolved in the ink composition or the viscosity of the ink composition may be increased, and as a result, the coating ability of the ink composition may be deteriorated.

In another embodiment, the UV curable composition of the present invention may contain an acrylate monomer and a urethane acrylate oligomer as a polymerizable unsaturated compound. The UV curable composition may be used in combination with a urethane acrylate oligomer so as to obtain suitable hardness after curing, without impairing the dispersibility of pigments.

The acrylate monomer chemically reacts with the urethane acrylate oligomer during curing to achieve an appropriate degree of curing.

The acrylate monomer may comprise at least one selected from the group consisting of a monofunctional acrylate monomer having one acrylate functional group, a bifunctional acrylate monomer having two acrylate functional groups, and a polyfunctional acrylate monomer having three or more acrylate functional groups.

The monofunctional acrylate monomer may comprise an alkyl acrylate having a linear or branched alkyl group having 1 to 14 carbon atoms. The composition of the present invention can ensure an appropriate viscosity through the alkyl group having the above range of carbon atoms and can achieve an appropriate degree of curing and hardness after curing.

For example, the alkyl acrylate may be selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, tetradecyl (meth)acrylate and combinations thereof.

The monofunctional acrylate monomer may further contain a carboxyl group-containing (meth)acrylate monomer or a hydroxy group-containing (meth)acrylate monomer. The appropriate adhesive force can be imparted through a carboxyl group or a hydroxyl group. For example, the (meth)acrylate monomer containing a carboxyl group or a hydroxyl group may comprise any one selected from the group consisting of acrylic acid, methacrylic acid, 2-(meth)acryloyloxyacetic acid, 3-(meth)acryloyloxypropanoic acid, 4-(meth)acryloyloxybutanoic acid, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, 2-hydroxypropylene glycol (meth)acrylate, and the combinations thereof. In one embodiment, the monofunctional (meth)acrylate monomer may have a glass transition temperature (Tg) of about −60° C. to about 100° C. The composition according to the present invention can achieve low cure shrinkage via the monofunctional acrylate monomer having a glass transition temperature (Tg) in the above range.

Examples of the monomer containing two or more acrylate functional groups include bifunctional monomers such as propylene glycol diacrylate, trifunctional monomers such as pentaerythritol triacrylate, and hexafunctional monomers such as dipentaerythritol hexaacrylate, but are not limited thereto. When a cured product having a relatively low modulus of elasticity is required, it is preferable to use a monofunctional compound. However, the modulus of elasticity of the cured product may be controlled by combining with a compound containing two or more acrylate functional groups in an appropriate ratio.

In one embodiment, the acrylate monomer may comprise at least one selected from the group consisting of tetrahydrofurfuryl acrylate, cyclic trimethylolpropane formal acrylate, bisphenol A epoxy diacrylate, 2-hydroxyethyl acrylate, hydroxypivalic neopentyl glycol diacrylate, hydroxyethyl methacrylate, trimethylolpropane triacrylate, tris(2-hydroxyethyl)isocyanurate triacrylate, pentaerythritol tetraacrylate, 2-hydroxyethyl acrylate and dipentaerythritol hexaacrylate, hexanediol diacrylate, tripropylene glycol diacrylate, dipentaerythritol hexaacrylate, dipentaerythritol pentaacrylate, and the like.

In one embodiment, it is preferred that the content of the monofunctional acrylate monomer is from 5 to 40% by weight based on the total weight of the ink composition. If the content is 5% by weight or less, the solubility of the initiator is lowered and the cure shrinkage of the coating layer is increased. If the content is 40% by weight or more, the hardness of the cured product is lowered and sticking phenomenon occurs.

In one embodiment, the content of the bifunctional or higher acrylate monomer is preferably from 10 to 70% by weight, for example from 15 to 50% by weight, based on the total weight of the ink composition. If the content is 10% by weight or less, the hardness of the coating layer is lowered. If the content is 70% by weight or more, the shrinkage of the coating layer is increased and its adhesive force to the substrate is lowered.

The urethane acrylate oligomer is a compound prepared by polymerizing a polyether polyol, a hydroxyl group-containing acrylic derivative and a diisocyanate compound, and has carbon-carbon double bonds at both terminals. The polyether polyol preferably has a number average molecular weight of 300 to 30,000, more preferably 500 to 10,000. As the diisocyanate compound, any aliphatic or aromatic diisocyanate may be used, which is used in ordinary urethane synthesis.

The urethane acrylate oligomer preferably has a number average molecular weight of 500 to 40,000, more preferably 500 to 30,000. If the number average molecular weight is less than 500, it is difficult to achieve the improved properties desired. If the number average molecular weight is more than 40,000, the overall photocuring property and the alkaline developability are adversely affected.

The urethane acrylate oligomer is preferably used in an amount of 0.5 to 30% by weight (which means weight percent of solids excluding solvent) based on the total weight of the ink composition. If it is used in an amount less than 0.5% by weight, it is difficult to obtain the improved properties desired. If it is used in an amount exceeding 30% by weight, there is a problem in photocurability.

In addition, the ink composition of the present invention may contain the acrylate monomer and the urethane acrylate oligomer in a weight ratio of 2:1 to 8:1. In another embodiment, the weight ratio of the acrylate monomer to the urethane acrylate oligomer may be from 2:1 to 6:1, or from 3:1 to 5:1.

The composition of the present invention may further contain a radical photopolymerization initiator for performing a curing reaction by light irradiation. The radical photopolymerization initiator may comprise any one selected from the group consisting of a hydroxyketone-based compound, a phenylglyoxylate-based compound, a benzyldimethylketal-based compound, an α-aminoketone-based compound, a monoacylphosphine-based compound, a bisacylphosphine-based compound, a phosphine oxide-based compound, a metallocene-based compound, an iodonium salt, and combinations thereof, but is not limited thereto.

The radical photopolymerization initiator is preferably contained in an amount of 0.5 to 10% by weight based on the total weight of the UV curable composition. If the content is less than 0.5% by weight, the curing reaction is not sufficiently accomplished. If the content is more than 10% by weight, the radical photopolymerization initiator is may not be completely dissolved in the curable composition or the viscosity of the composition may be increased, and as a result, the coatability of the composition may be deteriorated.

The curable ink composition contains a colorant. The colorant may be used in the form of a pigment dispersion containing one or more pigments, dyes, or a mixture thereof, and is not particularly limited as long as it can express colors as required.

In one embodiment of the invention, carbon black, graphite, metal oxide, organic black pigments and the like can be used as the pigment.

Examples of carbon black include Cisto 5HIISAF-HS, Cisto KH, Cisto 3HHAF-HS, Cisto NH, Cisto 3M, Cisto 300HAF-LS, Cisto 116HMMAF-HS, Cisto 116MAF, Cisto FMFEF-HS, Cisto SOFEF, Cisto VGPF, Cisto SVHSRF-HS, and Cisto SSRF (Donghae Carbon Co., Ltd.); Diagram black II, Diagram black N339, Diagram black SH, Diagram black H, Diagram LH, Diagram HA, Diagram SF, Diagram N550M, Diagram M, Diagram E, Diagram G, Diagram R, Diagram N760M, Diagram LR, #2700, #2600, #2400, #2350, #2300, #2200, #1000, #980, #900, MCF88, #52, #50, #47, #45, #45L, #25, # CF9, #95, #3030, #3050, MA7, MA77, MA8, MA11, MA100, MA40, OIL7B, OIL9B, OIL11B, OIL30B and OIL31B (Mitsubishi Chemical Corporation); PRINTEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX-35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100, and LAMP BLACK-101 (Degussa Co., Ltd.); RAVEN-1100ULTRA, RAVEN-1080ULTRA, RAVEN-106OULTRA, RAVEN-1040, RAVEN-1035, RAVEN-1020, RAVEN-1000, RAVEN-890H, RAVEN-890, RAVEN-88OULTRA, RAVEN-86OULTRA, RAVEN-850, RAVEN-820, RAVEN-79OULTRA, RAVEN-78OULTRA, RAVEN-76OULTRA, RAVEN-520, RAVEN-500, RAVEN-460, RAVEN-450, RAVEN-43OULTRA, RAVEN-420, RAVEN-410, RAVEN-250OULTRA, RAVEN-2000, RAVEN-1500, RAVEN-1255, RAVEN-1250, RAVEN-1200, RAVEN-119OULTRA, RAVEN-1170 (Columbia Carbon Co.), mixtures thereof, or the like.

As the organic black pigments, aniline black, lactam black, or perylene black series may be used, but the organic black pigments are not limited thereto.

In the present invention, the curable ink composition is cured by irradiation with UV radiation (e.g., 250 or 450 nm), more preferably with UV radiation having a long wavelength (e.g., 360 to 410 nm) to achieve a certain level of OD. For this purpose, the content of the colorant may be preferably 0.1 to 15% by weight, more preferably 0.5 to 8% by weight based on the total weight of the curable ink composition. If the content is less than 0.1% by weight, a level of OD applicable to the light-shielding film may not be obtained. If it exceeds 15% by weight, an excessive amount of colorant may not be dispersed in the ink and may be precipitated, or UV light may not penetrate into the film after coating and the film may not be sufficiently cured up to the core portion.

The curable ink composition may contain a surfactant that lowers the surface tension of the ink composition to exhibit a small taper angle.

As the surfactant, commercially available products can be used, for example it may be selected from the group consisting of Megafack F-444, F-475, F-478, F-479, F-484, F-550, F-552, F-553, F-555, F-570 and RS-75 (DaiNippon Ink & Chemicals), or Surflon S-111, S-112, S-113, S-121, S-131, S-132, S-141 and S-145 (Asahi Glass Co., Ltd.), or Fluorad FC-93, FC-95, FC-98, FC-129, FC-135, FC-170C, FC-430 and FC-4430 (Sumitomo 3M Co., Ltd.), or Zonyl FS-300, FSN, FSN-100 and FSO (DuPont), or BYK-306, BYK-310, BYK-320, BYK-331, BYK-333, BYK-342, BYK-350, BYK-354, BYK-355, BYK-356, BYK-358N, BYK-359, BYK-361 N, BYK-381, BYK-370, BYK-371, BYK-378, BYK-388, BYK-392, BYK-394, BYK-399, BYK-3440, BYK-3441, BYKETOL-AQ, BYK-DYNWET 800, BYK-SILCLEAN 3700 and BYK-UV 3570 (BYK), or Rad 2100, Rad 2011, Glide 100, Glide 410, Glide 450, Flow 370 and Flow 425 (TEGO), etc.

The surfactant is preferably contained in an amount of 0.1 to 5.0% by weight based on the total weight of the curable ink composition, and 0.5 to 3.0% by weight in another embodiment. When the content of the surfactant is less than 0.1% by weight, the effect of lowering the surface tension of the ink composition may be insufficient, resulting in coating failure when the ink composition is coated on the substrate. If the content is more than 5.0% by weight, the surfactant may be used in an excessive amount, resulting in a problem that the compatibility and the antifoaming property of the ink composition would rather be reduced.

The curable ink composition may further comprise a photosensitizer to compensate the curing properties on active energy ray with long wavelength.

The photosensitizer may be at least one selected from the group consisting of anthracene-based compounds such as anthracene, 9,10-dibutoxy anthracene, 9,10-dimethoxy anthracene, 9,10-diethoxy anthracene and 2-ethyl-9,10-dimethoxy anthracene; benzophenone-based compounds such as benzophenone, 4,4-bis(dimethylamino)benzophenone, 4,4-bis(diethylamino)benzophenone, 2,4,6-trimethylaminobenzophenone, methyl-o-benzoylbenzoate, 3,3-dimethyl-4-methoxybenzophenone and 3,3,4,4-tetra(t-butylperoxycarbonyl)benzophenone; acetophenone; ketone-based compounds such as dimethoxyacetophenone, diethoxyacetophenone, 2-hydroxy-2-methyl-1-phenylpropan-1-one and propanone; perylene; fluorenone-based compounds such as 9-fluorenone, 2-chloro-9-fluorenone and 2-methyl-9-fluorenone; thoixanthone-based compounds such as thioxanthone, 2,4-diethyl thioxanthone, 2-chloro thioxanthone, 1-chloro-4-propyloxy thioxanthone, isopropyl thioxanthone (ITX), diisopropyl thioxanthone; xanthone-based compounds such as xanthone and 2-methylxanthone; anthraquinone-based compounds such as anthraquinone, 2-methyl anthraquinone, 2-ethyl anthraquinone, t-butyl anthraquinone and 2,6-dichloro-9,10-anthraquinone; acridine-based compounds such as 9-phenylacridine, 1,7-bis(9-acridinyl)heptane, 1,5-bis(9-acridinylpentane) and 1,3-bis(9-acridinyl) propane; dicarbonyl compounds such as benzyl, 1,7,7-trimethyl-bicyclo[2,2,1]heptane-2,3-dione and 9,10-phenanthrenequinone; phosphine oxide-based compounds such as 2,4,6-trimethylbenzoyldiphenylphosphine oxide and bis(2,6-dimethoxybenzoyl)-2,4,4-trimethylpentylphosphine oxide; benzoate-based compounds such as methyl-4-(dimethylamino)benzoate, ethyl-4-(dimethylamino)benzoate and 2-n-butoxyethyl-4-(dimethylamino)benzoate; amino synergists such as 2,5-bis(4-diethylaminobenzal)cyclopentanone, 2,6-bis(4-diethylaminobenzal)cyclohexanone, and 2,6-bis(4-diethyaminobenzal)-4-methyl-cyclopentanone; coumarin-based compounds such as 3,3-carbonylvinyl-7-(diethylamino)coumarin, 3-(2-benzothiazolyl)-7-(diethylamino) coumarin, 3-benzoyl-7-(diethylamino)coumarin, 3-benzoyl-7-methoxy-coumarin and 10,10-carbonylbis[1,1,7,7-tetramethyl-2,3,6,7-tetrahydro-1H,5H,11H-C1] benzopyrano[6,7,8-ij]quinolizin-11-one; chalcone compounds such as 4-diethylaminochalcone and 4-azidobenzalacetophenone; 2-benzoylmethylene; and 3-methyl-b-naphthothiazoline.

The photosensitizer is preferably contained in an amount of 1 to 200 parts by weight, more preferably 10 to 100 parts by weight, based on 100 parts by weight of the photopolymerization initiator. If the amount is less than 1 part by weight, a synergistic effect of curing sensitivity at a desired wavelength may not be obtained. If the amount is more than 200 parts by weight, the photosensitizer may not be dissolved in the ink and the adhesive strength and crosslinking density of the pattern may be deteriorated.

The curable ink composition may further comprise an adhesion promoter as an additive.

The light-shielding film on the cut surface of the waveguide repeatedly shrinks and expands depending on the conditions of use such as temperature and humidity, so that the light-shielding film may be stressed, and as a result, the light-shielding film is detached from the waveguide. In order to prevent this, at least one silane-based compound selected from the group consisting of an alkoxysilane-based compound, an epoxysilane-based compound, an aminophenylsilane-based compound, an aminosilane-based compound, a mercaptosilane-based compound and a vinylsilane-based compound may be used as the adhesion promoter.

In the aspect of the present invention, an epoxysilane-based compound may be used as the adhesion promoter.

The adhesion promoter is preferably contained in an amount of 0.1 to 15% by weight, more preferably 2 to 10% by weight based on the total weight of the ink composition. If the amount is less than 0.1% by weight, the light-shielding film cannot be prevented from being detached from the waveguide. If the amount is more than 15% by weight, the viscosity of the ink solution increases and the dispersibility of the promotor is low.

The curable ink composition used in the present invention exhibits excellent coating properties, and exhibits excellent adhesion properties by curing. The ink composition has a curing dose of 1 to 10,000 mJ/cm$^2$, preferably 80 to 3,000 mJ/cm$^2$. The ink composition is cured by absorbing UV light in a wavelength range of 250 nm to 450 nm, preferably 360 nm to 410 nm.

The UV curable composition, for example, having a viscosity of 10 to 10,000 mPa·s or 100 to 10,000 mPa·s at 25° C., is suitable for a dispenser process. The composition having such a viscosity range is well discharged at a process temperature. The process temperature refers to a heated temperature in order to lower viscosity of the UV curable composition. The process temperature may be from 10° C. to 100° C., and preferably from 20° C. to 70° C.

In addition, when the curable ink composition is evaporated, for example, in a convection oven at 35° C., the residual mass after the elapse of 2 hours may be 85% or more, so that the curing rate and the film characteristics may not be degraded while the evaporation rate is low.

For forming the light-shielding film on the cut surface of the rim side of the planar waveguide in the step a), a dispenser process or an inkjet printing method may be used. The inkjet printing method can be used in a usual manner. The dispenser process may use a pneumatic or piezo-electric dispensing valve as a fine dispensing device, preferably a dispenser printing method.

Figures 4A, 4B:
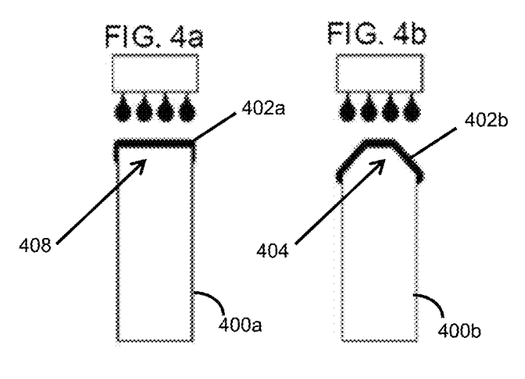
FIGS. 4A-C are a schematic view showing a method for forming a light-shielding film according to the shape of the cut surface of the rim side of the waveguide tube of the present invention.
Figure 4C:
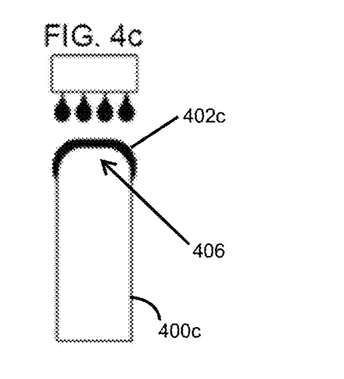

When the ink composition is coated by the above-described printing method, as shown in FIGS. 4A-C, it may be effectively coated and cured to form a light-shielding film 402a-c on the cut surface of the rim side of the waveguide tube 400a-c, where the cut surface having an inclined surface 404 (FIG. 4B), a curved surface 406 (FIG. 4C), or a planar surface 408 (FIG. 4A).

The curing in the step b) may be UV curing. A light source in a wavelength of 250 to 450 nm, more preferably, 360 to 410 nm may be used in the UV curing.

In addition, the thickness of the light-shielding film produced by the above method may be 2 to 120 μm, and in another embodiment may be 3 to 60 μm.

On the basis of the light-shielding film having the thickness of 1.0 μm prepared by the above-described method, the optical density (OD) of the film may be 0.01 to 0.7. If the thickness of the film is 2 to 80 μm, its optical density (OD) may be 0.03 to 0.7. If the thickness of the film is 80 to 120 μm, its optical density (OD) may be 0.01 to 0.03.

Further, the hardness of the light-shielding film prepared by the above-described method may be pencil hardness from 3H to 9H according to the ASTM D3363 standard.

The cut surface of the rim side of the waveguide tube, which includes the light-shielding film, may be a planar surface, a curved surface, or an inclined surface, and the light-shielding film may be formed on the lateral surface or the rim of the cut surface of the rim side of the waveguide.

The present invention also provides a waveguide module comprising the waveguide as above. The waveguide module is not particularly limited as long as the waveguide of the present invention is used, but it can be used for augmented reality (AR) glasses and the like Hereinafter, the present invention will be described in detail with reference to examples.

EXAMPLES

TABLE 1

| Composition | | Example 1 | Example 2 |
|---|---|---|---|
| Pigment | Carbon black | 1.2 | 2 |
| Monofunctional acryl monomer | Tetrahydrofurfuryl acrylate | 15 | 17 |
| | Cyclic trimethylolpropane formal acrylate | 2 | 2 |
| Bifunctional acryl monomer | Bisphenol A epoxy diacrylate | 5 | 5 |
| | Hydroxypivalic neopentyl glycol diacrylate | 19.8 | 15 |
| Multifunctional acryl monomer | Trimethylolpropane triacrylate | 5 | 5.4 |
| | Tris(2-hydroxyethyl)isocyanurate triacrylate | 8 | 8 |
| | Pentaerythritol tetraacrylate | 6.4 | 8 |
| Urethane acrylate oligomer | CN8887 | 15 | 15 |
| | Phosphate methacrylate | 10 | 10 |
| Organosilane | 3-Aminopropyl trimethoxy silane | 3 | 3 |
| Photopolymerization initiator | Bis(2,4,6-trimethylbenzoyl)-phenylphosphine oxide | 2 | 2 |
| | 2-Benzyl-2-dimethylamino-1-(4-morpholinophenyl)-butanone-1 | 4 | 4 |
| | Diphenyl(2,4,6-trimethylbenzoyl)phosphine oxide | 1 | 1 |
| Photosensitizer | | 1.6 | 1.6 |
| Surfactant | | 1 | 1 |

TABLE 2

| Composition | | Example 3 | Example 4 | Comp. Example 1 | Comp. Example 2 |
|---|---|---|---|---|---|
| Colorant | Carbon black Pigment | 0.6 | 0.6 | 12 | 11 |
| Aliphatic epoxy | 3,4- Epoxycyclohexylmethyl-3',4'-epoxycyclohexane | 42.3 | 57.8 | 12.48 | 41.8 |
| | Bi-7-oxabicyclo[4.1.0]heptane | 25 | 0 | 0 | 0 |
| Vinyl ether | 1,4-Cyclohexanedimethanoldivinylether | 6 | 13 | 10.6 | 7.5 |
| Oxetane | 3-Ethyl-3-[[(3-ethyloxetane-3-yl)methoxy]methyl]oxetane | 12.85 | 20.35 | 29.5 | 14 |
| Acrylic resin | Epoxy acrylic resin | 5 | 0 | 0 | 0 |
| Solvent | Diethylene glycol dibutylether | 0 | 0 | 27.42 | 0 |
| | 2-Butoxyethanol | 0 | 0 | 0 | 15.2 |

TABLE 2-continued

| Composition | | Example 3 | Example 4 | Comp. Example 1 | Comp. Example 2 |
|---|---|---|---|---|---|
| Photoinitiator | 4-Isobutylphenyl-4'-methylphenyliodium hexafluorophosphate | 3.75 | 3.75 | 4 | 4.5 |
| Organosilane | 3-Glycidoxypropyltrimehoxysilane | 2.5 | 2.5 | 2 | 4 |
| Photosensitizer | | 1 | 1 | 1 | 1 |
| Surfactant | | 1 | 1 | 1 | 1 |

Figure 5:
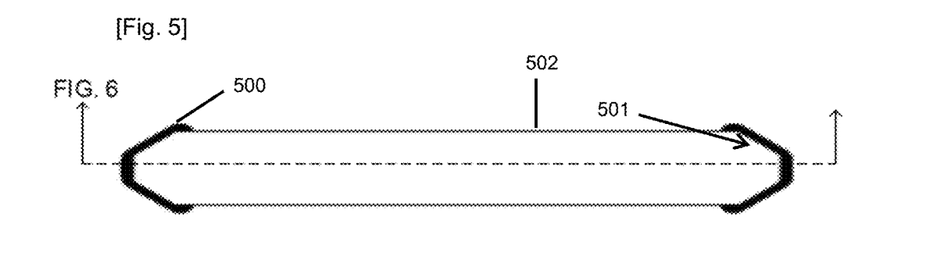
FIG. 5 is a schematic cross-section view of the waveguide manufactured according to the Examples of the present invention.
Figure 6:
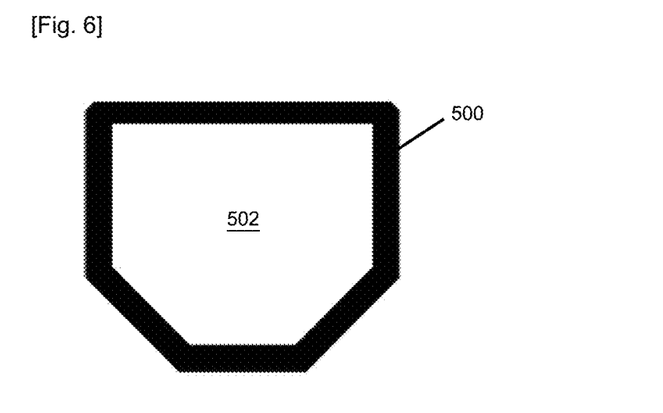
FIG. 6 is a schematic front view of the waveguide manufactured according to the Examples of the present invention.

The compositions for forming a light-shielding film which are prepared by mixing the constituents of Examples 1 to 4 and Comparative Examples 1 and 2 were coated by a dispenser process on the cut surfaces of the rim side 501 of the cleaned waveguides 502 (illustrated in FIGS. 5-6) so as to have the thickness as shown in Table 3 below after curing. In order to prevent foreign matters from adhering, the coating layers were irradiated with UV light (395 nm) under the following conditions and cured within 1 minute after coating to form the light-shielding films. The UV light was irradiated at a light intensity of 2500 mJ/cm$^2$ by using an LED lamp having a wavelength of 395 nm.

EXPERIMENTAL EXAMPLE

Experimental Example 1

Evaluation of OD of the Light-shielding Film

The OD values of the respective light-shielding films were measured by using an X-rite OD measuring device and are shown in Table 3 below.

Experimental Example 2

Pencil Hardness

The respective coating layers of the compositions according to Examples 1 to 4 and Comparative Examples 1 and 2 were formed on glass substrates by a spin-coating method, and UV curing (395 nm, 2700 mJ/cm$^2$) was performed. Then, the pencil hardness was measured by using a pencil hardness meter. According to ASTM D3363 (Standard Test Method for Film Hardness by Pencil Test), a pencil is installed to the pencil hardness tester and a weight of 500 g is exerted. Then, the pencil is held against the substrate at a 45° angle and the coating layers are scratched at a rate of 180 mm/min. The highest pencil hardness was determined at which the coating layer was not cut or peeled off from the substrate. The results are shown in Table 3 below.

TABLE 3

| | Example 1 | Example 2 | Example 3 | Example 4 | Comparative Example 1 | Comparative Example 2 |
|---|---|---|---|---|---|---|
| Thickness (μm) | 116 | 45 | 50 | 5 | 4 | 9 |
| OD on a basis of a thickness of 1 μm | 0.013 | 0.042 | 0.03 | 0.03-0.04 | 0.90 | 0.70 |
| Pencil hardness | 9H | 9H | 9H | 5H | 4B | 2B |

From the results shown in Table 3, the respective light-shielding films prepared in Examples 1 to 4 exhibited the hardness of 5H or more even without any heat treatment, whereas the light-shielding films prepared in Comparative Example 1 and Comparative Example 2 exhibited the hardness of 4B and 2B, respectively. It was confirmed that the light-shielding films prepared in Examples 1 and 2 achieve hardness superior to conventional materials.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A planar waveguide, comprising:
   a waveguide tube having a first surface and an opposing second surface separated by a thickness there between, wherein the first and second surfaces extend to a rim side, wherein the rim side extends along the thickness of the waveguide tube, the rim side having a cut surface; and
   a light-shielding film prepared from a curable ink composition disposed on the cut surface of the rim side of the waveguide tube,
   wherein the thickness of the light-shielding film is 2 to 120 μm,
   the optical density (OD) of the light-shielding film is 0.01 to 0.7 relative to a light-shielding film having a thickness of 1.0 μm, and
   the hardness of the light-shielding film is pencil hardness 3H or more in accordance with ASTM D3363 standard,
   wherein the curable ink composition comprises a colorant, an epoxy compound, an oxetane compound, and a photopolymerization initiator, or comprises a colorant, an acrylate monomer, a urethane acrylate oligomer, an organosilane, and a photopolymerization initiator,
   wherein the colorant comprises a black ink pigment, and
   wherein the content of the black ink pigment is 0.1% to 8% by weight on the basis of total weight of the film.

2. The planar waveguide according to claim 1, wherein the black ink pigment is selected from the group consisting of carbon black, graphite, metal oxide and organic black pigments.

3. The planar waveguide according to claim 1, wherein the thickness of the light-shielding film is 3 to 60 μm.

4. The planar waveguide according to claim 1, wherein the cut surface is a planar surface, a curved surface, or an inclined surface.

5. The planar waveguide according to claim 1, wherein the light-shielding film is disposed on the first and second surfaces at the periphery thereof.

6. A waveguide module comprising the waveguide according to claim 1.

7. A method for manufacturing a planar waveguide, comprising:
coating a curable ink composition on a cut surface of a rim side of the waveguide tube, wherein the waveguide tube having a first surface and an opposing second surface separated by a thickness therebetween, wherein the first and second surfaces extend to the rim side, wherein the rim side extends along the thickness of the waveguide tube, the rim side having the cut surface; and
curing the curable ink composition to form a light-shielding film, wherein the light-shielding film having a thickness of 2 to 120 μm, having an optical density (OD) of 0.01 to 0.7 relative to a light-shielding film having a thickness of 1.0 μm, and having a hardness of 3H or more in accordance with ASTM D3363 standard, wherein the curable ink composition comprises a colorant, an epoxy compound, an oxetane compound, and a photopolymerization initiator, or comprises a colorant, an acrylate monomer, a urethane acrylate oligomer, an organosilane, and a photopolymerization initiator,
wherein the colorant comprises a black ink pigment, and
wherein the content of the black ink pigment is 0.1% to 8% by weight on the basis of total weight of the film.

8. The method for manufacturing a waveguide according to claim 7, wherein the curable ink composition comprises the acrylate monomer and the urethane acrylate oligomer in a weight ratio of 2:1 to 8:1.

9. The method for manufacturing a waveguide according to claim 7, wherein coating the curable ink composition further comprises:
coating the curable ink composition on the cut surface of the rim side using a dispenser process or an inkjet printing method.

10. The method for manufacturing a waveguide according to claim 7, wherein the curing is ultraviolet (UV) curing.

11. The method for manufacturing a waveguide according to claim 7, wherein the thickness of the light-shielding film is 3 to 60 μm.

12. The method for manufacturing a waveguide according to claim 7, wherein the cut surface is a planar surface, a curved surface, or an inclined surface.

13. The method of manufacturing a waveguide according to claim 7, wherein the light-shielding film is disposed on the first and second surfaces at the periphery thereof.

* * * * *